Patented Apr. 5, 1949

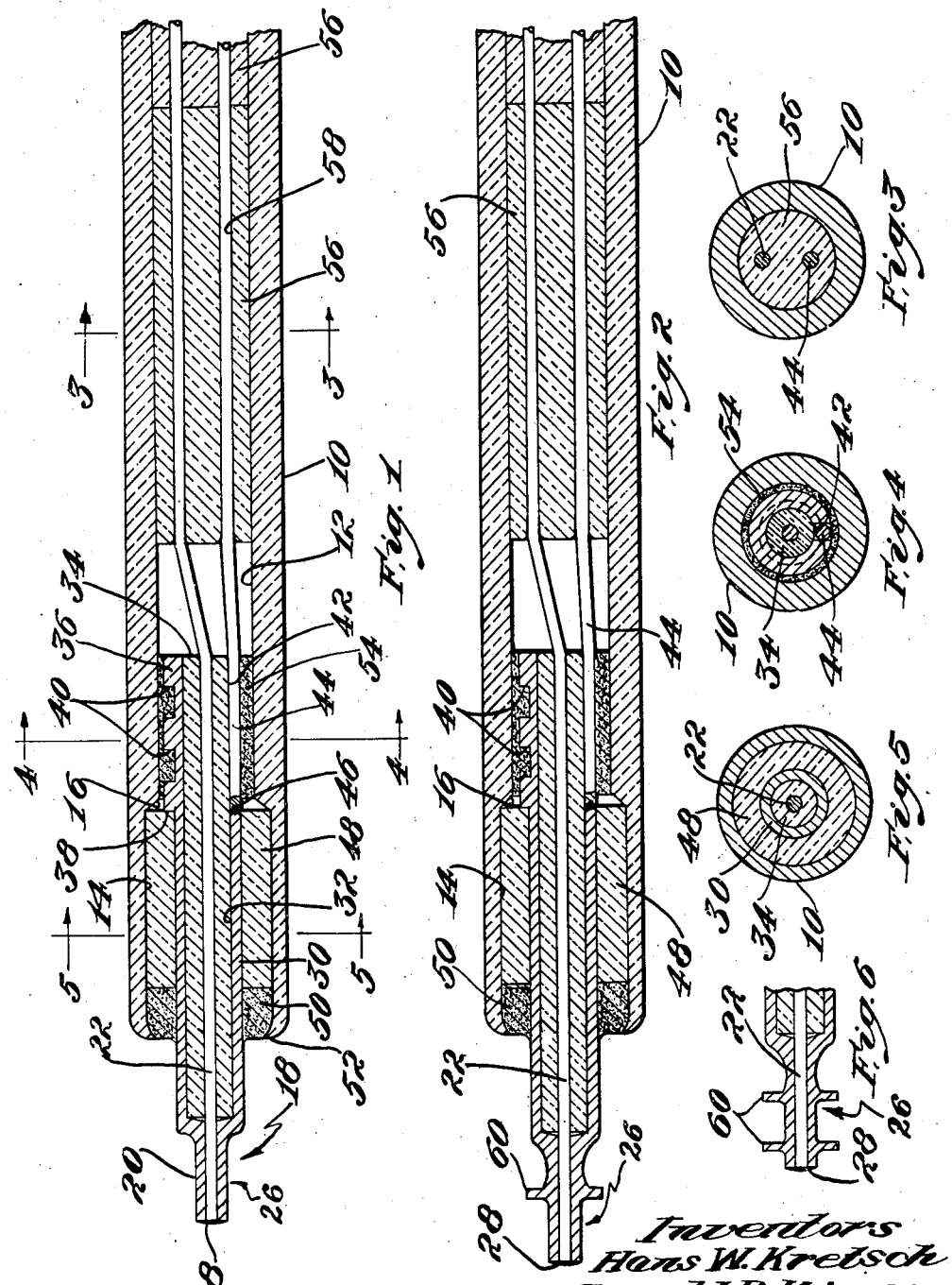

2,466,175

UNITED STATES PATENT OFFICE 2,466,175

THERMOCOUPLE SHEATH WITH EXPOSED JUNCTION

Hans W. Kretsch, Bridgeport, and Donald B. Miner, Stratford, Conn., assignors to Manning, Maxwell & Moore, Incorporated, New York, N. Y., a corporation of New Jersey Application September 3, 1947, Serial No. 771,924

2 Claims. (Cl. 136—4)

This invention relates to thermocouples and more particularly to improvements in thermocouples of the type employed to measure the temperature of hot gases such as the exhaust gases from the tail pipe of gas turbines.

The gases exhausted through the tail pipe of gas turbines travel at a high velocity, are extremely hot, and are highly corrosive. The conventional thermocouple for measuring the temperature of such gases has consisted of two dissimilar wires welded at one end to form a hot junction and suitably supported to hold the hot junction in the stream of hot gases, but such unprotected couples have a comparatively short life. By choosing the wire diameters larger, the life of such a thermocouple may be improved but its rate of response is proportionately lessened. To overcome this disadvantage, wires of small diameter and hence of a high rate of response have been used, and to lengthen their life have been inserted in a protective tube of suitable material not attacked by the hot gases, but this, while improving the life of the thermocouple, materially reduces its rate of response. In some instances an opening has been made in such a protective tube to allow the hot gases to circulate over the hot junction, but the accuracy of such a thermocouple is spoiled in part by the fact that its response will depend upon the direction of the gas stream with respect to the opening. Still another type of thermocouple has been made by inserting one element thereof into the other element which is in the form of a tube and joining the elements so that the tubular element serves as a protective member for the first element. Such a coupling has characteristics between the unprotected coupling and the protected coupling referred to above, but has the disadvantages that the tube which forms one element of the hot junction is not electrically insulated from the hot junction.

Objects of this invention are to provide an improved thermocouple which will have a high rate of response and longevity, will be of simple construction and thoroughly insulated both electrically and thermally from its supporting structure.

In accordance with these objects the thermocouple comprises a hollow support preferably of some insulating material within which is arranged substantially axially thereof a thermocouple element which includes two dissimilar metals having coterminal ends which project from one end of the support forming an integrated, spine-like hot junction. One of the elements is hollow and surrounds the other, thereby protecting the inner element except for the end face thereof which is exposed and in one form of the invention the outer element may have one or more peripheral radial flanges back of the end thereof to increase the surface to mass ratio of the spine and decrease the radiation losses. The two elements are separated from each other back of the integrated portion thereof by an insulating sleeve embracing the included element and closely fitting within the hollow portion of the outer element. The external surface of the hollow element is of two diameters separated by an annular shoulder, and that portion of larger diameter has formed therein parallel and longitudinal grooves. The longitudinal grooves terminate at the annular shoulder and a lead wire or conductor lies therein with an end abutting the inner end of the grooves and welded thereto, and this conductor, together with an extension of the included element, extends rearwardly through the casing. A second sleeve surrounds the portion of the hollow element of smaller diameter, filling the space between it and the inner wall of the casing, with its inner end abutting the annular shoulder therein, and a shoulder spaced inwardly of the end of the casing. A packing for example a cementitious material is placed against the outer end of the surrounding sleeve, holding it in place. To further secure the thermocouple element in place, a packing is placed between the portion of the surrounding element of larger diameter and the sleeve in the vicinity of the peripheral grooves and fills the same. The rearwardly extending portions of the included element and the conductor attached to the surrounding element are held in spaced relation to each other and to the casing by insulators having spaced apertures through which the rearwardly extending portions pass.

The invention will now be described with reference to the accompanying drawings, in which:

Fig. 1 is a longitudinal section through the thermocouple of this invention;

Fig. 2 is a similar longitudinal section of a somewhat modified form of the thermocouple;

Fig. 3 is a section on the line 3—3 of Fig. 1;

Fig. 4 is a section on the line 4—4 of Fig. 1;

Fig. 5 is a section on the line 5—5 of Fig. 1; and

Fig. 6 is a fragmentary longitudinal section showing the spine-like projection provided with two flanges.

Referring to Fig. 1, the thermocouple comprises a cylindrical hollow support 10 which may be comprised of some suitable insulating material such as porcelain having a central passage extending therethrough of two diameters 12 and 14, the latter being of somewhat larger diameter than the former and occupying a position near one end of the support. The portions 12 and 14 of the passage are separated by an internal annular shoulder 16. Within this tubular support there is disposed in an axial position and substantially concentrically with respect thereto a thermocouple element 18 which includes outer and inner elements 20 and 22 respectively composed of dissimilar metals, the coterminal portions of these elements being integrally joined at 24 to form a spine-like projection 26 in which only the end face 28 of the element 22 is exposed. As thus constructed, the element 22 may be of small diameter and selected primarily for its high rate of response since it will not be exposed to the corrosive action of the hot gases, whereas the element 20 may be of larger diameter and selected for its durability and longevity when exposed to hot corrosive gases. It is to be observed also that the tubular structure of the element 20 provides for a better strength to weight ratio than two wires of the same diameter either unsupported or with a protecting tube. The spine-like projection 26 extends from the open end of the support and has formed integrally therewith a rearwardly extending enlarged tubular portion 30 formed integral with the outer portion and through which passes the inner element 22. The tubular portion 30 preferably should project from the support 10 approximately 3/16 of an inch. The inner element 22 is held spaced from the tubular portion 30 and concentric thereto by means of an insulating sleeve 34 composed of ceramic material which is fitted into the tubular portion 30 and closely fits about the inner element 22. The rear end of the tubular portion 30 is of somewhat larger diameter, as shown at 36, and is separated from the forward portion by a laterally extending external annular shoulder 38. In this rear enlarged portion there are formed spaced, parallel, peripheral grooves 40 and a longitudinal groove 42, the latter being cut entirely through the wall of the tubular portion 30 and terminating at the shoulder 38. Within the groove 42 there lies a lead wire or conductor 44 of the same material as the tube or one which has a smaller thermoelectric force as compared to the material of the inner element which is welded or otherwise electrically fastened to the tubular portion 30 adjacent to the shoulder 38.

To hold the thermocouple as thus constituted securely in the support against both longitudinal and rotational movement, there is disposed in the enlarged portion 14 of the support a sleeve 48 composed of a suitable ceramic insulating material, this sleeve closely fitting the tubular portion 30 and occupying the space between it and the inner wall of the support. The inner end of this sleeve abuts the internal shoulder 16 of the support and the external shoulder 38 of the tubular element 30, and the outer end terminates short of the open end of the support. To retain the sleeve in place, a packing such as a cementitious material 50 is packed in the open end of the support against the outer end of the sleeve, filling the unoccupied space, and thus holding the sleeve in place. To retain this cementitious material the end of the support may be spun inwardly as at 52. To further secure the thermocouple element in place a packing such as a cementitious material 54 is packed in around the enlarged portion 36 so as to fill the space between it and the support and also to fill the peripheral grooves 40, thereby to lock the thermocouple in place. The rearwardly extending lead wire or conductor 44 and the rearwardly extending portion of the included element 22 are held spaced from each other and from the walls of the outer support 10 by means of cylindrical, elongated ceramic insulators 56 having spaced passages 58 therein through which the members pass. As many of these insulating members 56 may be used as is necessary to carry the conductors entirely through the support.

In the somewhat modified form of the invention, as shown in Fig. 2, the thermocouple includes elements corresponding to those shown in Fig. 1, that is, the dissimilar elements 20 and 22 mounted within a support 10 and held therein by the sleeve-like insulating element 14 and 56. The spine-like projections 26, however, of this modified form of the invention differ from the previously described spine in that the outer element has formed near the end portion thereof one or more radially extending annular flanges or fins 60 whose purpose is to increase the surface to mass ratio of the sensitive portion and to decrease the radiation losses from the hot junction. In Fig. 6 two of such flanges or fins 60 are shown. These flanges may be formed integral with the outer element 20, for example, by machining, casting, or spinning.

In both forms of the invention the hot junction, which is formed by joining the dissimilar elements 20 and 22, is joined in such a manner that the outside diameter of the spine at its tip is no greater than the normal outside diameter of the element 20 rearwardly thereof, the joining of the two elements being produced in a manner to minimize increasing the bulk of the joint by the use of atomic hydrogen welding with a special flux. It is to be observed that the fusion of the metals takes place only at the end faces of the spine and included element. The maximum diameter of the spine should not be greater than .055 inch at the tip.

By constructing the thermocouples in accordance with the above disclosure, it is clear that a maximum rate of response and a maximum longevity may be secured since the dissimilar metals may be so selected that the inner protected one of the elements, that is, the element 22, is of small diameter and hence has a high rate of response, and the outer element 20 is of larger diameter and is selected for its durability when exposed to hot corrosive gases. The outer element 20, as is illustrated, protects the inner element and completely encloses the same except for the end face of the inner element and moreover because of its tubular construction adds material strength to the spine. Moreover, the elements as assembled in the support 10 are insulated therefrom, both thermally and electrically, by the porcelain insulating elements 48 and 56 interposed between them and the support.

It should be understood that the present disclosure is for the purpose of illustration only and that this invention includes all modifications and equivalents which fall within the scope of the appended claims.

We claim:

1. A thermocouple comprising a hollow support, a thermocouple arranged substantially axially thereof comprised of dissimilar metals consisting of an inner element and an outer element having co-terminal ends forming a composite spine projecting from an end of the support, one of the outer elements surrounding the inner except for the end face thereof, said element having a rearwardly extending hollow portion of larger diameter than the inner element through which the inner element passes, an insulating sleeve embracing the inner element and closely fitting within the hollow portion, said hollow portion having annular grooves in its outer peripheral surface, a sleeve surrounding a portion of the hollow element and filling the space between it and the support, a shoulder against which one end of the sleeve abuts, packing placed in the open end of the support against the opposite end of the sleeve to retain it in place, packing situated in the space between the support near the rear end of the hollow element in the vicinity of the peripheral grooves, and conductors extending rearwardly from the dissimilar elements through the support and being insulated therefrom and from each other by insulating means fitting into the support.

2. A thermocouple comprising a hollow support having a central passage of two diameters divided by an internal annular shoulder, a thermocouple arranged substantially axially thereof comprised of dissimilar metals in the form of inner and outer elements having co-terminal ends constituting a projecting spine-like hot junction projecting from the support, the outer element surrounding the inner except for the end face thereof, said metals being integrally joined, said outer element having a rearwardly extending hollow portion of larger inside diameter than the inner element through which the inner element passes, an insulating sleeve within said hollow portion separating the inner element from the outer element said hollow portion having portions of differing outside diameters divided by an internal annular shoulder, peripheral and longitudinal grooves in the portion of larger outside diameter, said longitudinal groove terminating at said shoulder, an insulating sleeve surrounding the portion of smaller diameter and filling the space between it and the support, said sleeve abutting at one end said external and internal annular shoulders respectively, a cementitious material packed in the open end of the support adjacent the other end to hold the sleeve and hence the surrounding element, a cementitious material packed about the portion of larger diameter between it and the support in the vicinity of the grooves, a conductor lying in the longitudinal groove with an end welded to the surrounding element which is of smaller thermoelectric force than the surrounding element, said conductor and a continuation of the included element passing rearwardly through the support, and an insulator in the support having passages therein through which these conductors pass.

HANS W. KRETSCH.
DONALD B. MINER.

REFERENCES CITED

The following references are of record in the file of this patent:

UNITED STATES PATENTS

| Number | Name | Date |
|---|---|---|
| 1,367,026 | Drinker | Feb. 1, 1921 |
| 1,584,882 | Marsh et al. | May 18, 1926 |
| 2,304,489 | Wetzel | Dec. 8, 1942 |
| 2,305,585 | Alfery | Dec. 22, 1942 |
| 2,318,479 | Gillis | May 4, 1943 |

FOREIGN PATENTS

| Number | Country | Date |
|---|---|---|
| 5,868 | Great Britain | 1899 |